US007178623B2

(12) United States Patent
Ginzel et al.

(10) Patent No.: US 7,178,623 B2
(45) Date of Patent: Feb. 20, 2007

(54) OPERATOR CONTROL ASSEMBLY

(75) Inventors: Geoffrey D. Ginzel, Peoria, IL (US); Mark B. Rinkel, Edelstein, IL (US); Bryan G. Poorman, Tiskilwa, IL (US)

(73) Assignee: Caterpillar Inc, Peoria, IL (US)

( * ) Notice: Subject to any disclaimer, the term of this patent is extended or adjusted under 35 U.S.C. 154(b) by 374 days.

(21) Appl. No.: 10/739,318

(22) Filed: Dec. 19, 2003

(65) Prior Publication Data
US 2005/0133292 A1 Jun. 23, 2005

(51) Int. Cl.
B60K 26/00 (2006.01)

(52) U.S. Cl. .................................. 180/315; 297/411.2

(58) Field of Classification Search ............... 180/315, 180/324; 297/411.2, 411.4, 217.3; 74/528
See application file for complete search history.

(56) References Cited

U.S. PATENT DOCUMENTS

| 3,580,636 | A |  | 5/1971 | Setto |
| 4,055,230 | A |  | 10/1977 | Kestian et al. |
| 4,140,200 | A |  | 2/1979 | Tucek |
| 4,200,166 | A |  | 4/1980 | Hansen |
| 4,392,546 | A |  | 7/1983 | Brown et al. |
| 4,476,954 | A |  | 10/1984 | Johnson et al. |
| 4,478,308 | A |  | 10/1984 | Klaassen |
| 4,699,239 | A |  | 10/1987 | Ishino et al. |
| 4,702,520 | A |  | 10/1987 | Whisler et al. |
| 4,895,039 | A |  | 1/1990 | Hegg |
| 4,895,040 | A |  | 1/1990 | Soederberg |
| 4,914,976 | A |  | 4/1990 | Wyllie |
| 5,042,314 | A |  | 8/1991 | Rytter et al. |
| D323,279 | S |  | 1/1992 | Soederberg |
| 5,086,870 | A |  | 2/1992 | Bolduc |
| 5,244,066 | A |  | 9/1993 | Mackoway et al. |
| 5,286,078 | A |  | 2/1994 | Mottino et al. |
| 5,379,663 | A |  | 1/1995 | Hara |
| 5,448,028 | A |  | 9/1995 | Filion et al. |
| 5,520,258 | A | * | 5/1996 | Kemshall ................. 180/68.5 |
| 5,566,778 | A |  | 10/1996 | Valier et al. |
| 5,924,515 | A |  | 7/1999 | Stauffer |
| 5,938,282 | A |  | 8/1999 | Epple |
| 5,960,903 | A |  | 10/1999 | Abels et al. |
| 6,039,141 | A |  | 3/2000 | Denny |
| 6,061,617 | A | * | 5/2000 | Berger et al. ................. 701/50 |
| 6,065,365 | A |  | 5/2000 | Ostler et al. |
| D427,207 | S |  | 6/2000 | Altmann et al. |
| D429,246 | S |  | 8/2000 | Holma |
| 6,164,285 | A |  | 12/2000 | Garberg et al. |
| 6,276,749 | B1 |  | 8/2001 | Okazawa et al. |
| D463,459 | S |  | 9/2002 | Tamaru et al. |
| 6,536,825 | B2 | * | 3/2003 | McAndrew et al. ...... 296/37.13 |
| 6,634,453 | B2 | * | 10/2003 | Arthur et al. ............... 180/315 |
| 6,843,681 | B2 | * | 1/2005 | Sanner ..................... 439/536 |
| 6,948,582 | B2 | * | 9/2005 | Shiomi et al. .............. 180/315 |
| 2005/0072619 | A1 | * | 4/2005 | Amamiya et al. .......... 180/315 |

* cited by examiner

Primary Examiner—Paul N. Dickson
Assistant Examiner—Drew J. Brown
(74) Attorney, Agent, or Firm—Finnegan, Henderson, Farabow, Garrett & Dunner

(57) ABSTRACT

An operator control assembly for a work machine has an armrest, an operator interface, and a base common to the armrest and operator interface. The operator interface has at least one control device. An electronic control module is in communication with the operator interface and at least one component of the work machine, and is mechanically coupled to at least one of the armrest, the operator interface, and the base.

20 Claims, 3 Drawing Sheets

OPERATOR CONTROL ASSEMBLY

TECHNICAL FIELD

The present invention is directed to an operator control assembly for a work machine and, more particularly, to an operator control assembly having an integrated armrest and machine controller.

BACKGROUND

Work machines such as for example, agricultural tractors, articulated trucks, wheel loaders, and other types of heavy machinery are used for a variety of tasks requiring operator control of the work machine. The operator may control the work machine through an operator interface. The operator interface may include one or more controllable devices electronically linked to an electronic control module. The electronic control module may receive signals from, and send signals to both the operator interface and various components of the work machine.

The operator interface may be located on or within an armrest of an operator's seat. For example, U.S. Pat. No. 6,039,141 (the '141 patent) issued to Denny on Mar. 21, 2000, describes an operator station for a vehicle. The operator station has a seat and a plurality of electronic, operator-controllable devices supported to move with the seat. The operator control devices may be configured to generate an electronic signal for controlling a function associated with the vehicle.

However, the '141 patent does not disclose an electronic control module, its functionality, nor its location with respect to the armrest. In addition, the armrest of the '141 patent may not be compatible with various vehicle cab designs because of its combined nature with the seat. The '141 patent also does not disclose a "plug & play" compatibility with the various operator controlled devices.

The present invention is directed towards overcoming one or more of the problems as set forth above.

SUMMARY OF THE INVENTION

In one aspect, the present disclosure is related to an operator control assembly for a work machine that includes an armrest, an operator interface, and a base common to the armrest and operator interface. The operator interface includes at least one control device. An electronic control module is in communication with the operator interface and at least one component of the work machine, and is mechanically coupled to at least one of the armrest, the operator interface, and the base.

In yet another aspect, the present disclosure is related to a work machine that includes a traction device and an operator cabin supported by the traction device. The work machine also includes an operator control assembly disposed within the operator cabin. The operator control assembly includes an armrest, an operator interface, and a base common to the armrest and operator interface. The operator interface has at least one control device. The operator control assembly also includes an electronic control module in communication with the operator interface and at least one component of the work machine. The electronic control module is mechanically coupled to at least one of the armrest, the operator interface, and the base.

DETAILED DESCRIPTION

Figure 1:
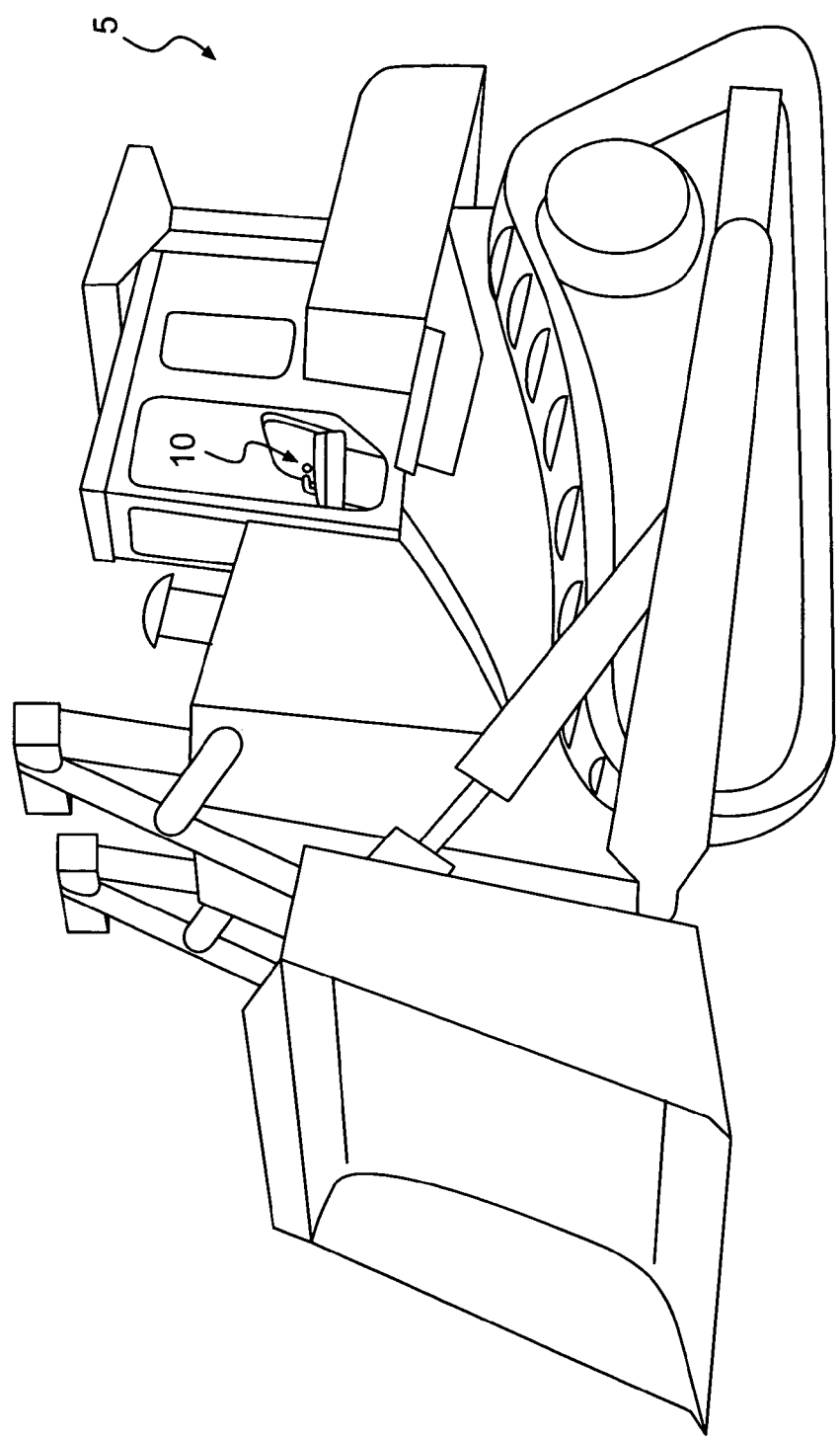
FIG. 1 illustrates a diagrammatic perspective view of a work machine having an exemplary embodiment of an operator control assembly with an integrated armrest and machine control in accordance with the present disclosure.

An exemplary embodiment of a work machine 5 having an operator control assembly with an integrated armrest and machine controller 10 is illustrated in FIG. 1. The work machine 5 may be an agricultural tractor, an articulated truck, a wheel loader, or any other type of work machine known in the art.

Figure 2:
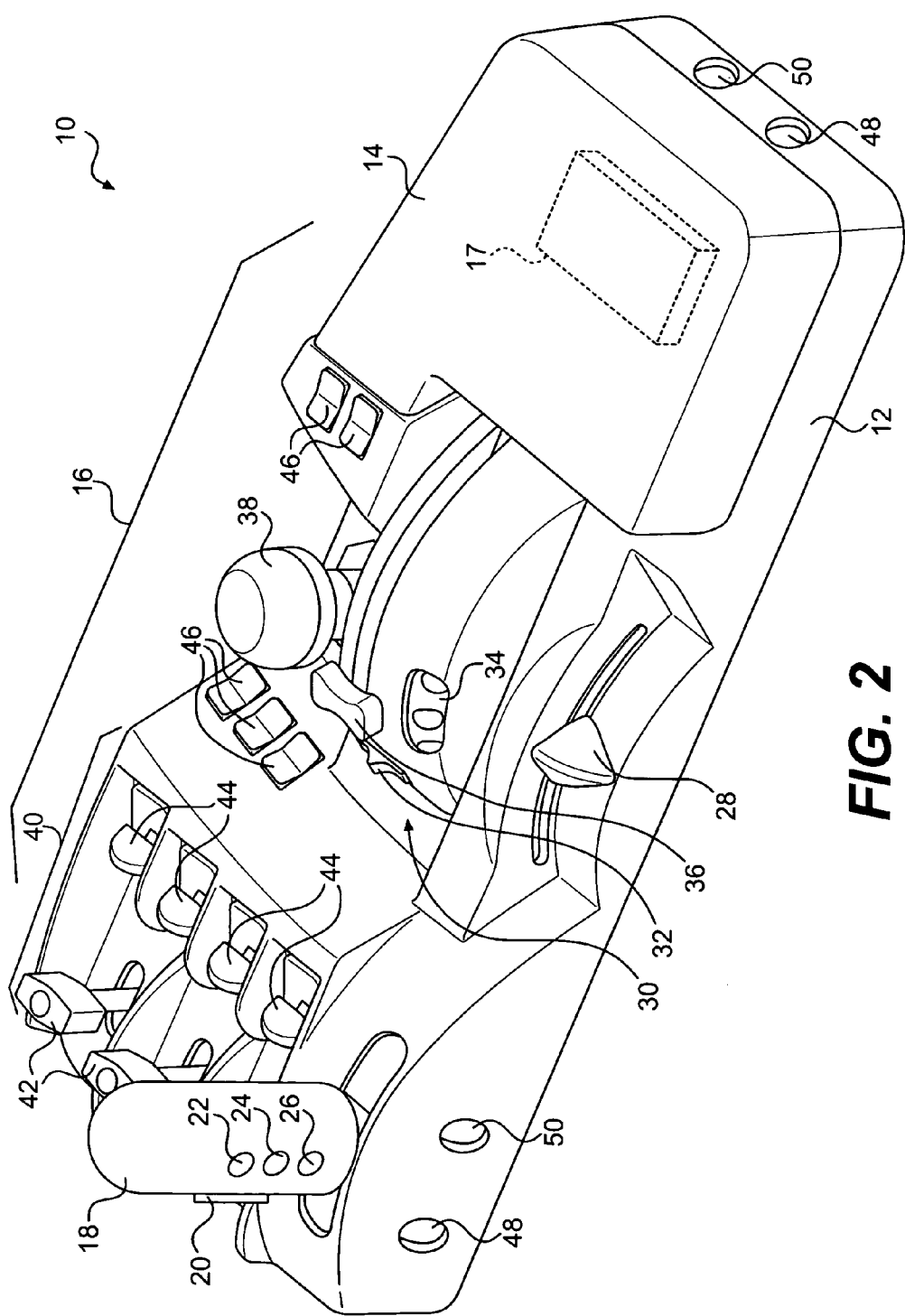
FIG. 2 illustrates a diagrammatic perspective view of an exemplary embodiment of an operator control assembly with an integrated armrest and machine control in accordance with the present disclosure.

FIG. 2 illustrates the integrated armrest and machine controller 10 including a base 12 configured to house an armrest 14, an operator interface 16 having a plurality of control devices, an electronic control module (ECM) 17, and a plurality of communication and power ports 48, 50, respectively.

The base 12 may include a generally rectangular housing configured to support the armrest 14 on one upper portion, and the operator interface 16 on another upper portion. The base 12 may enclose and protect the internal mechanisms and electronics of the operator interface 16, the ECM 17, as well as the connections between the operator interface 16 and the ECM 17. The base 12 may be configured to mount the armrest 14 and operator interface 16 to an operator seat, an interior wall of an operator cabin, a floor of the operator cabin, or in any other manner known in the art so that the armrest 14 and operator interface 16 are within reach of an operator.

The armrest 14 may include a flat upper surface of a substantially rectangular shape. The armrest 14 may include padding configured to support and cushion an operator's forearm, while shielding the internal components of the integrated armrest and machine controller 10 against potentially damaging environmental factors such as for example, impact loading and moisture. FIG. 2 illustrates the armrest 14 as intended for a right-handed operator. It is, however, contemplated that the armrest 14 may be similarly fashioned for a left-handed operator.

The operator interface 16 may be located on the upper portion of the base 12, forward of the armrest 14 and may include numerous devices to control the components, features, and functions of the work machine 5. The operator interface may be configured to allow an operator to rest the forearm while having access to the control devices with little movement of a wrist, hand or arm of the operator. For example, the operator interface 16 may include a transmission control lever 18, disposed forward of the armrest 14 and located towards one side of the base 12.

The transmission control lever 18 may be configured to control the traveling direction of the work machine 5. As illustrated in FIG. 2, transmission control lever 18 may be movable from a central position to a forward position to cause forward travel of the work machine 5. The transmission control lever 18 may also be movable from a central position to a rearward position to cause rearward travel of the work machine 5. In addition, the transmission control lever 18 may also be used to control the work machine ground speed. Transmission control lever 18 may include buttons located on a side of the transmission control lever 18 and a mechanical lock 20 located on a forward side of the transmission control lever 18. In this embodiment, the transmission control lever 18 has three buttons, including one button 22 that controls shifting gear ratios from a lower ratio to a higher ratio, one button 24 that controls shifting gear ratios from a higher ratio to a lower ratio, and one button 26 that controls shifting to and from a park position. One skilled in the art will recognize that a greater or lesser number of buttons may be used to control the function of the transmission and the buttons may or may not be located on the transmission control lever 18. The mechanical lock 20 may be used in connection with moving the transmission to and from a neutral position.

Operator interface 16 may also include a throttle control 28 located between the transmission control lever 18 and the armrest 14. The throttle control lever 28 may be used to control a desired engine speed of the work machine between a low-speed throttle position and a high-speed throttle position. One skilled in the art will recognize that the throttle control 28 may be any type of control device for manipulating the desired engine speed such as, for example, a lever mechanism or a knob mechanism.

An implement position control 30 may be centrally disposed relative to the base 12 and adjacent the throttle control 28. The implement position control 30 may include an implement height control 32, a soil depth control 34, and an implement block 36. In the disclosed embodiment, implement height control 32 may be a slide mechanism that functions as an upper limit control on the position of an implement. Soil depth control 34 may be an adjustable wheel mechanism that functions as a lower limit control on the position of the implement. Implement block 36 may be configured to block the implement at the lower limit set by the soil depth control 34. Implement block 36 may be overridden to move the implement beyond the limit.

Operator interface 16 may also include a Power Take-Off (PTO) control 38 located forward of the armrest 14 and adjacent the implement position control 30. A PTO is a supplementary mechanism enabling engine power to be used to operate nonautomotive apparatus such as, for example, a pump, a saw, or any other nonautomotive apparatus known in the art. The PTO control 38 may be configured to engage or disengage the PTO system of the work machine 5. In the disclosed embodiment, the PTO control 38 is a push/pull mechanism activated by pushing the PTO control 38 downward towards the base 12 until a collar is abutted, then pulling up on the collar. One skilled in the art will recognize that that the PTO control 38 may be any type of control mechanism for engaging and disengaging the PTO system of the work machine 5 such as, for example, a switch or a button.

The operator interface 16 may also include implement controls 40 located forward of the implement position controls 30 and the PTO control 38, and adjacent the transmission control lever 18. Implement controls 40 may be configured for linear control of the work machine implements. In the disclosed embodiment, seven implement controls are included, including three joystick controls 42 (one not shown located behind transmission control lever 18) and four switches 44. The implement controls 40 may be used for independent modulation and directional control of hydraulic flow for up to seven different hydraulic circuits controlling various work machine functions such as, for example, vertical hitch movement. One skilled in the art will recognize that implement controls 40 may be used for any work machine function requiring control of hydraulic circuits, that there may be a greater or lesser number of control mechanisms, and that the implement controls 40 may be any type of control mechanisms for modulating and controlling the directional flow of hydraulic circuits.

The operator interface 16 may also include system switches 46 located between the implement controls 40 and the armrest 14, and adjacent the implement position control 30. System switches 46 may be used to control any cabin or work machine level feature and/or function that requires an on/off input such as for example, lighting, heating, air-conditioning, or any other feature and/or function known in the art.

It is understood that the operator interface may be configured in numerous other manners having the individual control devices placed in other locations within the operator interface. The operator interface may also include more or fewer control devices. In addition to the control devices described above, the operator interface may include any other means for receiving input indicative of a desired work machine function. Further, the same control devices may be used to control different functions of the work machine than those described above.

Figure 3:
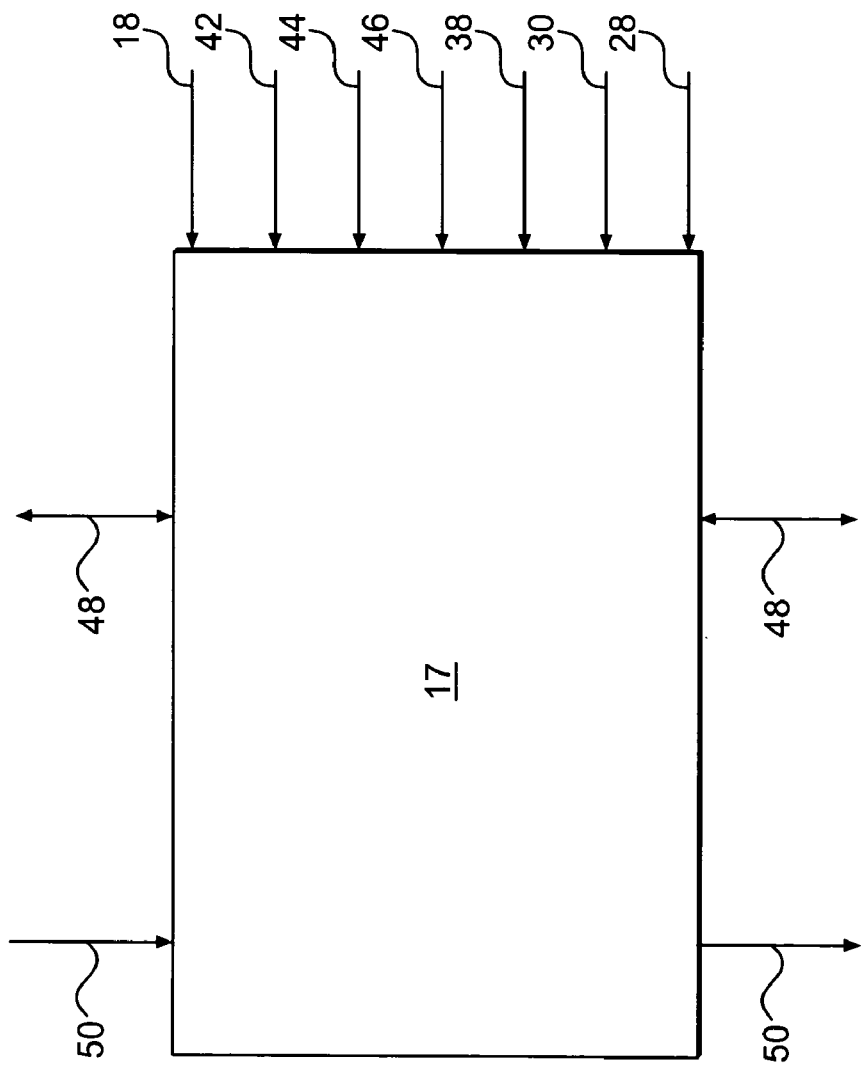
FIG. 3 is a schematic illustration of an electronic control module of an exemplary embodiment of an operator control assembly with an integrated armrest and machine control in accordance with the present disclosure.

The integrated armrest and machine controller 10 may include the ECM 17 being located in or otherwise mechanically coupled to the armrest 14. Alternately, the ECM 17 may be located in or otherwise mechanically coupled to the operator interface 16, or the base 12. As illustrated in FIG. 3, the ECM 17 may be in communication with the various control devices 18, 28, 30, 38, 42, 44, 46, of the operator interface 16 to enable signals to flow to the ECM 17 from the control devices and the plurality of communications ports 48 and power ports 50. The ECM 17 may include all the components required to run an application such as, for example, a memory, a secondary storage device, and a processor, such as a central processing unit or any other means known in the art for controlling the work machine. Various other known circuits may be associated with the ECM 17 such as, for example, power supply circuitry, signal conditioning circuitry, solenoid driver circuitry.

The communication ports 48 may allow communication between a removably attached device, and the ECM 17 and work machine 5. The communication ports 48 may be configured to receive a data link connector that provides for Controller Area Network (CAN) communications. The communication ports 48 and ECM 17 may also be configured to receive any other type of communication data link known in the art. The communication ports 48 may be used for programming limits, calibration values, modulation characteristics, and functionality of the ECM 17, operator interface 16, and work machine 5. The power ports 50 may be configured to receive a power plug to provide power to the removably attached device. Referring to FIG. 1, the communication and power ports 48, 50 may be located in the base 12. Alternately, the communication and power ports 48, 50 may be located in the operator interface 16, in the armrest 14, or in any other location known in the art.

Examples of the removably attached device that may plug into the communication and power ports 48, 50 for use with the operator control assembly may include a display monitor (not shown), a programming unit, a computer, or any other device that may be used to communicate with the ECM 17 and work machine 5. The display monitor may be mounted to the base 12, the operator interface 16, or the armrest 14.

The programming unit may likewise be connected to the operator control assembly or may be a handheld unit.

INDUSTRIAL APPLICABILITY

An operator control assembly with an integrated armrest and machine controller 10 may be used as a cost-effective means for controlling the functions and features of the work machine 5 while providing an efficient and comfortable environment for the operator. The integrated armrest and machine controller 10 may be modular and designed to accommodate a variety of cab designs. The integrated armrest and machine controller 10 may be used with or without an operator seat, and may be mounted anywhere within convenient reach of the operator. Because the ECM 17 may be integral with the integrated armrest and machine controller 10, the integrated armrest and machine controller 10 may be easily retrofit to existing work machines.

The integrated armrest and machine controller 10 may be used to control a variety of machine components, functions, and features. For example, the travel direction and speed of the work machine 5, may be controlled via the transmission control lever 18. Forward movement is initiated by moving the transmission control lever 18 to a forward position. Rearward movement is initiated by moving the transmission control lever 18 to a rearward position. Higher gear ratios may be selected by depressing button 22. Lower gear ratios may be selected by depressing button 24. Mechanical lock 20 may be used to select or maintain a neutral position. Button 26 may be used to select a park position.

Additional functions of the work machine 5 may also be controlled with the integrated armrest and machine controller 10. Desired engine speed may be communicated to an engine of the work machine 5 via a throttle control 28. Implement position limits may be set with implement position control 30, including an implement height, and implement depth. The PTO may be engaged and disengaged with PTO control 38. Implement controls 40 may be used to control linear movement of the work machine implements by moving joystick controls 42 and switches 44. System switches 46 may be used to activate various system components, functions, and/or features. The integrated armrest and machine controller may also be used to control additional and different components or functions of the work machine. As noted above, one skilled in the art will recognize that a greater or lesser number of control mechanisms may be included in the operator interface 16 and that the control mechanisms may control functions other than the specific functions described above.

Because the ECM 17 may be included in the integrated armrest and machine controller 10, functionality of the integrated armrest and machine controller 10 may be expanded. The integrated armrest and machine controller 10 may be programmed, calibrated, and modulated via a CAN data link, or by any other data link known in the art. For example, an operator may determine a desired work tool for use with the work machine 5, and a particular desired function of the work tool. The operator may then program the integrated armrest and machine controller 10 via the removably attached display or a programming tool connected to the communication ports 48 to ECM 17 with parameters to accept and control the desired work tool to perform the desired functions. The operator may calibrate the work tool, program limits and ranges, and modulate the various systems within the control of the ECM 17.

In addition, because the ECM 17 may be included in the integrated armrest and machine controller 10, high level machine functions may be possible with the integrated armrest and machine controller 10. High level machine functions may include, for example, one touch programming, guidance, and other high level machine functions known in the art. One touch programming may include causing the integrated armrest and machine controller 10 to enter a learn mode to record a sequence of operator functions. The operator may then operate a control mechanism within the operator interface 16 to cause the work machine 5 to repeat the learned sequence.

A cost savings may also be realized when the ECM 17 is included in the integrated armrest and machine controller 10. For example, the ECM 17 inside of the integrated armrest and machine controller 10 may be functional to control other systems within the work machine 5. Other systems that may be controlled with the ECM 17 may include, for example, the engine, a transmission, various implements, and others as known in the art. The expanded functionality of the integrated armrest and machine controller 10 may allow other ECMs located throughout the work machine to be eliminated and/or simplified with control transferred to the ECM 17 within the integrated armrest and machine controller 10.

In addition, because the integrated armrest and machine controller 10 has its own ECM 17, the integrated armrest and machine controller 10 may be used with work machines that would normally not have the controlling power to support complex machine controls. In this instance, the functionality of the entire work machine 5 may be expanded.

Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. An operator control assembly for a work machine, comprising:
    an armrest;
    an operator interface having at least one control device;
    a base common to the armrest and operator interface;
    an electronic control module in communication with the operator interface and at least one component of the work machine, the electronic control module mechanically coupled to at least one of the armrest, the operator interface, and the base; and
    at least one communication port configured to receive a data link connector, wherein the communication port allows communication between a removably attached device and the electronic control module.

2. The operator control assembly of claim 1, further including:
    at least one power port configured to receive a power connector.

3. The operator control assembly of claim 2, wherein the at least one power port is configured to provide power to the removably attached device.

4. The operator control assembly of claim 1, wherein the operator interface includes a transmission control lever having at least one button, the control lever operable to control a directional rotation of a transmission and the at least one button operable to control a gear ratio of the transmission.

5. The operator control assembly of claim 1, wherein the operator interface includes a throttle slide control movable between a low-speed throttle setting and a high-speed throttle setting.

6. The operator control assembly of claim 1, wherein the operator interface includes an implement range limiter having an upper limit setting slide mechanism, a lower-limit setting wheel mechanism, and a block switch to limit linear translation of at least one implement.

7. The operator control assembly of claim 1, wherein the operator interface includes a push-pull actuator to engage and disengage a power take-off device.

8. The operator control assembly of claim 1, wherein the operator interface includes at least one joystick to actuate at least one hydraulic device.

9. The operator control assembly of claim 1, wherein the operator interface includes a plurality of switches operable to actuate at least one system function of the work machine.

10. The operator control assembly of claim 1, wherein the electronic control module is configured to allow operator programming of at least one of limits, modulation characteristics, and functionality of the electronic control module.

11. An operator control assembly for a work machine, comprising:
  an armrest;
  at least one means for receiving operator input indicative of a desired work machine function;
  a base common to the armrest and the receiving means;
  a means for controlling the work machine according to the input, the controlling means being mechanically coupled to at least one of the armrest, the input receiving means, and the base; and
  at least one communication port configured to receive a data link connector, wherein the communication port allows communication between a removably attached device and the controlling means.

12. The operator control assembly of claim 11, wherein the controlling means is configured to allow operator programming of at least one of limits, calibration values, modulation characteristics, and functionality of the controlling means.

13. The operator control assembly of claim 11, further including:
  at least one power port configured to receive a power connector.

14. The operator control assembly of claim 13, wherein the at least one power port is configured to provide power to the removably attached device.

15. A work machine, comprising:
  a traction device;
  an operator cabin supported by the traction device;
  an operator control assembly for the work machine, the operator control assembly disposed within the operator cabin and including:
    an armrest;
    an operator interface having at least one control device;
    a base common to the armrest and operator interface;
    an electronic control module in communication with the operator interface and at least one component of the work machine, the electronic control module mechanically coupled to at least one of the armrest, the operator interface, and the base; and
    at least one communication port configured to receive a data link connector, wherein the communication port allows communication between a removably attached device and the electronic control module.

16. The work machine of claim 15, wherein the electronic control module is configured to allow operator programming of at least one of limits, calibration values, modulation characteristics, and functionality of the electronic control module.

17. The work machine of claim 15, further including:
  at least one power port configured to receive a power connector.

18. The work machine of claim 17, wherein the at least one power port is configured to provide power to the removably attached device.

19. The work machine of claim 15, wherein the operator control assembly is configured to mount to an interior wall of the operator cabin.

20. The work machine of claim 15, wherein the operator control assembly is configured to mount to a floor of the operator cabin.

* * * * *